UNITED STATES PATENT OFFICE.

FREDERICK J. WARREN, OF NEWTON, MASSACHUSETTS; RALPH L. WARREN, OF BROOKLINE, AND FRANK G. CUTTER, OF BOSTON, MASSACHUSETTS, ADMINISTRATORS OF SAID FREDERICK J. WARREN, DECEASED.

BITUMINOUS PAVEMENT.

No. 799,619. Specification of Letters Patent. Patented Sept. 12, 1905.

Application filed April 6, 1903. Serial No. 151,416.

*To all whom it may concern:*

Be it known that I, FREDERICK J. WARREN, a citizen of the United States, and a resident of Newton, in the county of Middlesex and State of Massachusetts, have invented a new and useful Improvement in Bituminous Pavements, of which the following is a full, clear, and exact description.

Heretofore it has been customary in the manufacture of paving material to conduct at the works or before mixing with the mineral ingredients all the processes involved in making the cement and then to reheat and mix the completed cement with the stone preparatory to laying the pavement. This reheating has been necessary for the reason that the cement as stored and transported is in a comparatively hard and solid form and in this form could be supplied to the mixer only in chunks. These chunks could not be intimately mixed with the minerals, nor could they be melted and united with such minerals at temperatures to which the minerals are ordinarily heated for practical purposes and best results. To reduce the cold chunks of cement to a liquid form, requires heat considerably in excess of that required to combine the liquid cement with the minerals, and such reducing heat is ordinarily supplied in the cement-reheater. In the original preparation of the cement at the works it has been customary wherever the natural bitumens have been too hard or brittle to flux them with heavy oils until of the proper consistency, or if the natural bitumens have been too soft or oily it has been usual to remove the excess of oil. In my copending application, Serial No. 42,627, and my patents Nos. 727,506 and 727,507 I have described other processes involving the production of more perfect cements than theretofore known. In accordance with the common procedure and understanding of those engaged in the art all these processes are, as stated, conducted at the works or before mixing with the mineral ingredients. There are, however, several objections to this procedure of first making the cement and then at some future time applying it to the mineral ingredients of the intended roadway. The finished cement cannot be as readily and economically handled as desirable. Again, in melting the cement at the place of mixing with the mineral ingredients much heat and consequently much fuel and considerable apparatus—such as kettles, &c.—are necessary, and it is difficult to heat the cement and retain it heated at a proper and uniform temperature for such mixing. There is always a tendency to overheat the cement while carrying hot for use. Furthermore, the heat and energy in the stone-mixer, which, as presently to be shown, I use to great advantage, are ordinarily allowed to be lost.

My present invention relates to the discarding of the above-mentioned cement reheating and mixing procedure with its accompaniments and to the utilization in place thereof of such heat and energy as may be supplied to the interior of the stone-mixer.

My invention further relates to the separate preparation at the works or elsewhere of elements to compose, when united, the completed bituminous cement and to the mixing and uniting of such elements preferably simultaneously with each other and with the stone in the mixer by means of the heat of the stone and the agitation imparted through the same in the mixer. The said elements produced by me as part of this invention consist usually of a fluid preferably adapted to be handled cold and of a comparatively dry resinous bitumen. I also use when desired such elements as pulverized stone, pulverized clay, sand, soapstone, or other powder, such as carbon for modifying the character of the cement, as set forth, for instance, in my Patent No. 727,507.

As has already been indicated, there are various known methods, several of which have been invented by me, for producing cements from different bitumens and rendering them suitable for various purposes. Preferably I make the cement from natural hard asphalts, in themselves hard enough to pulverize and in this case to form the base of the resinous element. I use either the crude material as found in nature or any hard bituminous substance which in itself is resinous and dry enough to permit its powdering. This resinous element I produce in any of the one or more ways known to the art of producing hard bituminous substances and then pulverize it preferably to a powder. In this instance I of course provide a fluid hydrocarbon for fluxing the base, and this hydrocarbon may be any one of those fluid or semifluid bitumens, either containing some or no resinous matter, and the nature of the fluid material may vary anywhere from an oil without resinous matter to an oil combined with resinous bituminous matter, either in a fluid or semifluid state. I may find it advisable in some cases to have the softer constituents of the bitumen of such a firmness that a certain amount of heat would be necessary to make such constituents fluid, whereas I may use oily substances of any class. The best one possible to be used is such a heavy oil as has an asphalt base or has been removed from an asphalt, as covered by my Patent No. 727,506. I may, however, first make the cement at the works of a standard grade in any method known to the art of making a standard bituminous cement, either from coal-tar, asphalt, or other natural or artificial bituminous substances, and then separate the cement into two parts, preferably taking away just enough of the oil constituents to permit the resinous matter to pulverize and form a powder which will not reunite in transportation. It is not necessary, however, to stop the separation at this particular point, but when stopped at such a point there is less danger of changing the nature of the material by creating a molecular disruption, and the fluid material would under these circumstances be more fluid than if the separation were carried on to a point where the resinous matter is more brittle. In some cases, however, the creating of the molecular change which would occur in the cement I deem advisable, and in such case I might find it necessary to carry the separation on further so as to effect the molecular change which in itself might improve the physical properties of the cement when recombined.

Having obtained the fluid and solid cement elements or constituents in any of the ways above set forth, I store them separately and retain them separately until the time for cementing the minerals. The stone or other mineral elements are then heated, the cement elements introduced into the mixer, and the cement thus made and applied to the stone by a single act. In mixing the bituminous and other substances as indicated they are subdivided into very minute sections and in such subsections the working of the stony elements against each other and with the bituminous substances in the mixer brings about a practical agitation which combines the materials under the most advantageous circumstances, used at relatively lower temperatures than would be possible under any other method yet introduced. Depending upon the nature of the hard bituminous and other substances and the fluid bituminous substances and depending also upon the temperature, the subdivided substances will combine almost instantaneously. The harder or more resinous the bituminous substances the higher the temperature required in the mineral matter. The more fluid the liquid hydrocarbons the more readily does the combination take place at low temperatures—that is to say, the temperature at which the combination takes place satisfactorily depends entirely upon the physical and chemical properties of the subdivided substances. I heat the stony ingredients sufficiently to bring the consistency of the fluid bitumen to the proper point for the working of the mixture. The higher the temperature the more readily will the substances unite.

In my invention as above set forth the supplying of the elements in the form described permits of such a ready intermingling and intimate association of the same with the minerals that the comparatively low temperatures of the elements suffice to bring about the union, and thus the greater heat of the reheater is not required to be attained in the mixer. This is an important feature and clearly involves considerably more than the mere discarding of the reheater itself.

It is obvious that slight changes and modifications could be made in the selection and production of my cement and its elements and in the methods of applying the same to the minerals as herein set forth without involving a departure from the spirit of the invention.

By "stony ingredients" I mean any earthy or mineral matter of any size that may be combined with the elements forming the cement at the time such elements are associated, and in lieu of heating one of the elements or the mineral or earthy ingredients I may employ a temporary liquefier and fixer which preferably is combined with the elements of the cement and the earthy or mineral ingredients at the time they are all associated together, and this may be done at atmospheric temperatures.

Having thus fully described my invention, I claim and desire to secure by Letters Patent of the United States—

1. A method of making a sheet paving material consisting in making the bituminous cement thereof and said material simultaneously by agitating while heated, minerals and elements adapted when combined to form a cement of the constituency and consistency of sheet paving-cement.

2. A method of making a sheet paving material consisting in making the bituminous cement thereof and said material simultaneously by agitating with heated minerals, fluid and solid elements adapted when combined to form said cement, the heat of said minerals acting to effectuate the combination.

3. A method of making a sheet paving material consisting first in the preparation of a fluid element and such solid elements as will when combined form a bituminous cement and then simultaneously making said paving material and the cement thereof by mixing and agitating while heated, minerals and said fluid and solid elements.

4. A method of making a sheet paving material consisting in first dividing a bitumen into a fluid element and such solid elements as will when combined form a bituminous cement and then simultaneously making said paving material and the cement thereof by mixing and agitating said fluid and solid elements with mineral ingredients at a heat sufficient to combine the whole.

5. A method of preparing and laying a sheet pavement material consisting in making a bituminous cement, and simultaneously the paving composition of which it forms part, by agitating while heated, stony ingredients and elements adapted when combined to form said cement, and while the composition is still fluid, laying and pressing into the form of a sheet-pavement.

FREDERICK J. WARREN.

Witnesses:
J. M. DOLAN,
SAUL SIPPERSTEIN.